(12) United States Patent
Strasman et al.

(10) Patent No.: US 8,516,517 B1
(45) Date of Patent: Aug. 20, 2013

(54) SYSTEM AND METHOD FOR WIRELESSLY BROADCASTING ADVERTISEMENTS

(75) Inventors: Nery Strasman, Ramat Gan (IL); Ran Oz, Modi'in (IL)

(73) Assignee: Arris Solutions, Inc., Suwanee, GA (US)

( * ) Notice: Subject to any disclaimer, the term of this patent is extended or adjusted under 35 U.S.C. 154(b) by 1044 days.

(21) Appl. No.: 11/774,604

(22) Filed: Jul. 8, 2007

Related U.S. Application Data

(60) Provisional application No. 60/865,700, filed on Nov. 14, 2006.

(51) Int. Cl.
*H04N 7/10* (2006.01)
*H04N 7/025* (2006.01)
*H04N 7/16* (2011.01)
*H04H 60/33* (2008.01)

(52) U.S. Cl.
USPC .................................. 725/32; 725/9; 725/62

(58) Field of Classification Search
USPC ..................................................... 725/34, 35
See application file for complete search history.

(56) References Cited

U.S. PATENT DOCUMENTS 6,718,551 B1* 4/2004 Swix et al. ...................... 725/32
2002/0083442 A1* 6/2002 Eldering ......................... 725/34
2007/0283268 A1* 12/2007 Berger et al. ................... 715/716

* cited by examiner

*Primary Examiner* — Mark D Featherstone
(74) *Attorney, Agent, or Firm* — Troy Van Aacken

(57) ABSTRACT

A system, method and a computer-readable medium having a computer-readable code embodied therein for wirelessly broadcasting advertisements to handheld television receivers, the method includes: selecting a first advertisement to broadcast to a first group of handheld television receivers within a cell that are tuned to a first program; wherein the selecting is responsive to profiles of a first group of users that use the first group of handheld television receivers; selecting a second advertisement to broadcast to a second group of handheld television receivers within the cell that are tuned to a second program; wherein the selecting is responsive to profiles of a second group of users that use the second group of handheld television receivers; and wirelessly broadcasting a multiplex that comprises the first program, the second program, the first advertisement and the second advertisement.

36 Claims, 4 Drawing Sheets

SYSTEM AND METHOD FOR WIRELESSLY BROADCASTING ADVERTISEMENTS

FIELD OF THE INVENTION

The invention relates to methods, systems and computer program products for wirelessly broadcasting advertisements and especially for wirelessly broadcasting advertisements to handheld television receivers.

BACKGROUND OF THE INVENTION

Mobile and wireless communication technologies enable users to receive media content by using handheld devices. Digital Video Broadcasting-Handheld (DVB-H) is a relatively new communication standard. DVB-H enables a handheld television receiver to receive television programs over wireless channels. A brief description of the DVB-H standard and DVB-H compliant systems can be found in the following publications, all being incorporated herein by reference: "DVB-H: Digital Broadcast Services to Handheld Devices", G. Faria, J. A. Henriksson, E. Stare and P. Talmola, Proceedings of the IEEE, Vol. 94, No. 1, January 2006; "An investigation of and a Proposal for Handover Decision-making in DVB-H", X. D. Yang, Y. H. Song, O. J. Cosmas, T. Itagaki; and "DVB-H—the emerging standard for mobile data communication", and M. Korenfeld and U. Reimers, EBU Technical Review, January 2005.

DVB-H networks include DVB-H transmitters, each transmitter wirelessly broadcasts a multiplex of television programs to multiple handheld television receivers that are positioned within a cell. The cell can be expanded by using repeaters, but this is not necessarily so. It is noted that DVB-H networks can also utilize DVB-T transmitters, by applying time division multiplex techniques.

During the last few years, advertisement campaigns are spread among multiple communication channels, including so-called "new" media channels. DVB-H networks can provide a new advertisement platform that will be characterized by high accessibility as well as improved graphic interface.

There is a growing need to provide efficient methods, systems and computer program products for broadcasting advertisements over DVB-H networks.

SUMMARY OF THE INVENTION

A system for wirelessly broadcasting advertisements, the system includes a memory unit connected to a processor, the processor is adapted to instruct a handheld television receiver of a certain user of the first group of users to be tuned to the second program. When the instruction is sent a first program and a second program are wirelessly broadcast, handheld television receivers of users of the first group of users are tuned to receive the first program and handheld television receivers of the second group of users are tuned to receive the second program. The first program is associated with a first advertisement and the second program is associated with a second advertisement.

A system for wirelessly broadcasting advertisements, the system includes a memory unit connected to a processor. The processor is adapted to send to a certain user of a first group of users a request to be tuned to a second program. When the request is sent, first and second programs are wirelessly broadcast, handheld television receivers of the first group of users are tuned to receive the first program and handheld television receivers of the second group of users are tuned to receive the second program. The first program is associated with a first advertisement and the second program is associated with a second advertisement.

A system for wirelessly broadcasting advertisements, the system includes a memory unit connected to a processor. The processor is adapted to: (i) select a first advertisement to broadcast to a first group of handheld television receivers within a cell that are tuned to a first program, wherein the selection is responsive to profiles of a first group of users that use the first group of handheld television receivers; and (ii) assist in controlling a wireless broadcast of a multiplex that includes the first program and the first advertisement. Conveniently, the processor is also adapted to select a second advertisement to broadcast to a second group of handheld television receivers within a cell that are tuned to a second program, wherein the selection is responsive to profiles of a second group of users that use the second group of handheld television receivers; and to assist in controlling a wireless broadcast of a multiplex that also includes the second advertisement and the second program.

A computer readable medium having a computer-readable code embodied therein for wirelessly broadcasting advertisements to handheld television receivers, the computer-readable code includes instructions for: wirelessly broadcasting a first advertisement to a first group of handheld television receivers within a cell that are tuned to a first program; wirelessly broadcasting a second advertisement to a second group of handheld television receivers within a cell that are tuned to a first program; and instructing a handheld television receiver of a certain user of the first group of users to be tuned to the second program.

A computer readable medium having a computer-readable code embodied therein for wirelessly broadcasting advertisements to handheld television receivers, the computer-readable code includes instructions for: wirelessly broadcasting a first advertisement to a first group of handheld television receivers within a cell that are tuned to a first program; wirelessly broadcasting a second advertisement to a second group of handheld television receivers within a cell that are tuned to a first program; and sending to a certain user of the first group of users a request to be tuned to the second program.

A computer readable medium having a computer-readable code embodied therein for wirelessly broadcasting advertisements to handheld television receivers, the computer-readable code includes instructions for: selecting a first advertisement to be wirelessly broadcasted to a first group of handheld television receivers within a cell that are tuned to a first program; wherein the selecting is responsive to profiles of a first group of users that use the first group of handheld television receivers and wirelessly broadcasting a multiplex that includes the first program and the first advertisement.

Conveniently, the computer-readable code further includes instructions for selecting a second advertisement to be wirelessly broadcast to a second group of handheld television receivers within the cell that are tuned to a second program; wherein the selecting is responsive to profiles of a second group of users that use the second group of handheld television receivers; and wirelessly broadcasting a multiplex that also includes the second program and the second advertisement.

A method for wirelessly broadcasting advertisements to handheld television receivers, the method includes: wirelessly broadcasting a first advertisement to a first group of handheld television receivers within a cell that are tuned to a first program; wirelessly broadcasting a second advertisement to a second group of handheld television receivers within a cell that are tuned to a first program; and instructing a handheld television receiver of a certain user of the first group of users to be tuned to the second program.

A method for wirelessly broadcasting advertisements to handheld television receivers, the method includes: wirelessly broadcasting a first advertisement to a first group of handheld television receivers within a cell that are tuned to a first program; wirelessly broadcasting a second advertisement to a second group of handheld television receivers within a cell that are tuned to a first program; and sending to a certain user of the first group of users a request to be tuned to the second program.

A method for wirelessly broadcasting advertisements to handheld television receivers, the method includes: selecting a first advertisement to broadcast to a first group of handheld television receivers within a cell that are tuned to a first program; wherein the selecting is responsive to profiles of a first group of users that use the first group of handheld television receivers; and wirelessly broadcasting a multiplex that includes the first program and the first advertisement.

Conveniently, the method includes selecting a second advertisement to broadcast to a second group of handheld television receivers within the cell that are tuned to a second program; wherein the selecting is responsive to profiles of a second group of users that use the second group of handheld television receivers; and wherein the broadcasting includes broadcasting a multiplex that includes the first program, the second program, the first advertisement and the second advertisement.

BRIEF DESCRIPTION OF THE DRAWINGS

The abovementioned and other objects, features, and advantages of the present invention will become more apparent from the following detailed description, when applied in conjunction with the accompanying drawings. In the drawings, similar reference characters denote similar elements throughout the different views, in which.

DETAILED DESCRIPTION OF THE DRAWINGS

The method, system and computer program product utilize the benefits of broadcast technology and addressable advertising. Conveniently, each group of handheld television receivers that are tuned to a certain program receives an advertisement that matches the profiles (viewing patterns, socio-economical characteristics) of the users of that group of handheld television receivers. By dynamically monitoring which users belong to the group and finding a matching advertisement the effectiveness of an advertisement campaign can be increased.

Yet according to another embodiment of the invention the method, system and computer product can compensate for group-based decisions by finding advertisements that are better fitted (better matched) to certain users of the group. If such advertisements are found a request (aimed to the user) to be tuned to another program (in order to receive a better matching advertisement) can be sent. Additionally or alternatively, if such advertisements are found the handheld television receivers of such users can be instructed to be tuned to another program (in order to receive a better matching advertisement).

The better matching advertisement can be detected by correlating between one or more advertisement characteristics (or attributes) to one or more characteristics of the user profile. A certain threshold (or value) can be set in order to prevent frequent requests or instructions. Accordingly, a request or an instruction is sent if the better matching advertisement is better matching by a predefined value. The value can be set to zero or to another positive value.

For convenience of explanation, the following detailed description and associated drawings refer to a DVB-H compliant network. It is noted that the invention is not limited to the DVB-H standard and can be implemented on other networks and on other standards, without falling out of the true spirit of the invention.

Figure 1:
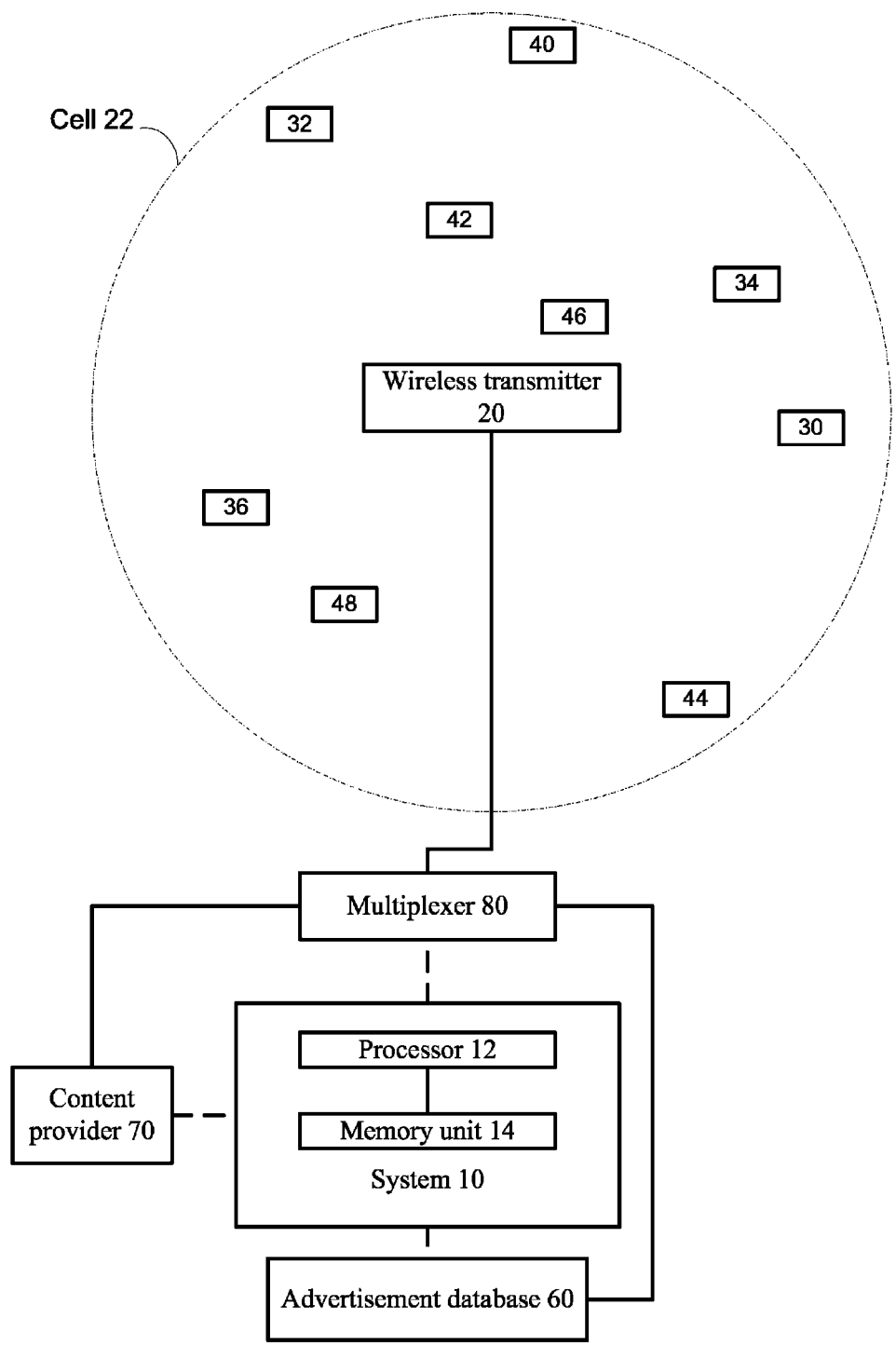
FIG. 1 illustrates a system and its environment, according to an embodiment of the invention.

FIG. 1 illustrates system 10 and its environment according to an embodiment of the invention. System 10 can be connected to the Internet, to an IP infrastructure network, to a local switch or router, to a DVB multiplexer, to a mobile network, to an advertisement server, to a terrestrial transmission network, and the like. For simplicity of explanation only a few components are illustrated in FIG. 1.

System 10 is connected to multiplexer 80, to content provider 70 and to advertisement database 60. Dashed lines illustrate control links while solid lines illustrate content links.

Content, such as a first program and a second program, can be sent from content provider 70, via multiplexer 80 to wireless transmitter 20 and then be wirelessly broadcast to multiple handheld television receivers. The first and second programs can be sent in response to requests from users of the handheld television receivers, but this is not necessarily so.

System 10 can receive one or more characteristics of advertisements that can be broadcast to handheld television receivers and can either receive or generate user profiles.

System 10 can assist in controlling a broadcast transmission of a multiplex that includes one or more programs and one or more advertisements. The assistance can involve sending instructions to wireless transmitter 20, sending instructions to multiplexer 80 that indicate how to generate the multiplex that is wirelessly broadcast, and the like.

Multiplexer 80 has content insertion capabilities that facilitate an insertion of the advertisements to the multiplex. It is noted that an equivalent component can include a multiplexer and a separate advertisement inserter.

Wireless transmitter 20 defines a cell (illustrated by dashed circle 22) in which multiple handheld television receivers are located. It is assumed that a first group of handheld television receivers (including 30, 32, 34, and 36) are tuned to receive a first program that is wirelessly broadcast by wireless transmitter 20. It is further assumed that a second group of handheld television receivers (including 40, 42, 44, 46 and 48) are tuned to receive a second program that is wirelessly broadcast by wireless transmitter 20.

System 10 can receive indications about the handheld television receivers that belong to each group (for example—by periodically polling) and can determine which advertisement to send to a first group and to a second group of users.

System 10 can determine that a first advertisement is to be sent to the first group in response to at least one of the following: (i) a profile of the first group of users that reflects profiles of users of the first group of users; (ii) individual profiles of users of the first group of users; (iii) correlation between a profile of the first group of users and at least one characteristic of the first advertisement, and (iv) correlations between profiles of individual users of the first group of users and at least one characteristic of the first advertisement.

System 10 can determine that a second advertisement is to be sent to the second group in response to at least one of the following: (i) a profile of the second group of users that reflects profiles of users of the second group of users; (ii) individual profiles of users of the second group of users; (iii) correlation between a profile of the second group of users and at least one characteristic of the second advertisement, and (iv) correlations between individual profiles of users of the second group of users and at least one characteristic of the second advertisement.

It is noted that system 10 can generate the profiles of the users, generate the group profile, receive the profiles of the users or receive the group profile. System 10 can also receive the at least one characteristic of multiple advertisements and select the first and second advertisements.

System 10 includes processor 12 and memory unit 14. Processor 12 may include a single processing unit, or be distributed across one or more processing units in one or more locations, e.g., on a client and server. Memory unit 14 may include any known type of data storage and/or transmission media, including magnetic media, optical media, random access memory (RAM), read-only memory (ROM), a data cache, a data object, etc. Moreover, similar to the processor, the memory unit 14 may reside at a single physical location, including one or more types of data storage, or be distributed across a plurality of physical systems in various forms.

Memory unit 14 can store information required by processor 12, including but not limited to user profiles, user group profile, advertisement characteristics, and the like.

Processor 12 is adapted to perform at least one of the following operations, or a combination thereof: (i) generate a profile of the first group of users that reflects individual profiles of users of the first group of users, (ii) generate a profile of the second group of users that reflect profiles of users of the second group of users, (iii) determine to send to a certain user of the first group of users a request to be tuned to the second program, (iv) determine to send to a certain user of the second group of users a request to be tuned to the first program, (v) determine to instruct a handheld television receiver of a certain user of the first group of users to be tuned to the second program, (vi) determine to instruct a handheld television receiver of a certain user of the first group of users to be tuned to the second program, (vii) calculate a correlation between an individual profile of the certain user and to at least one characteristic of the second advertisement, (viii) calculate a correlation between an individual profile of the certain user and to at least one characteristic of the first advertisement, (ix) determine that a correlation between an individual profile of the certain user and at least one characteristic of the second advertisement is higher by at least a predefined value than the correlation between the individual profile of the certain user and at least one characteristic of the first advertisement; (x) determine that a correlation between an individual profile of the certain user and at least one characteristic of the first advertisement is higher by at least a predefined value than the correlation between the profile of the certain user and at least one characteristic of the second advertisement; (xi) determine a timing of sending the request; and (xii) determining a timing of sending the instruction.

Figure 2:
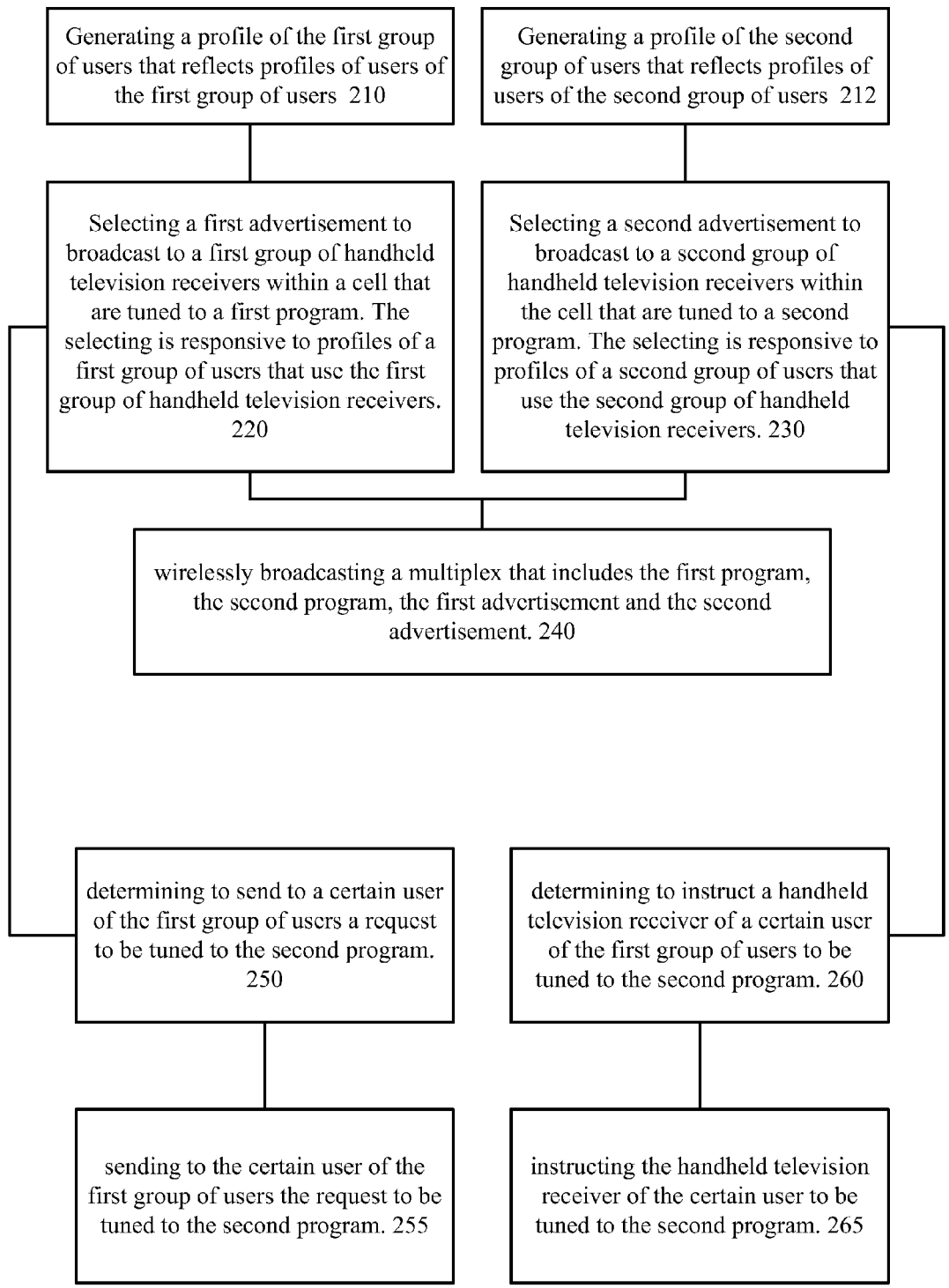
FIGS. 2-4 are flow charts of method for wirelessly broadcasting advertisements, according to various embodiments of the invention.

FIG. 2 illustrates method 200 for wirelessly broadcasting advertisements to handheld television receivers according to an embodiment of the invention.

Method 200 starts by stages 210 and 212 that are followed by stages 220 and 230.

Stage 210 includes generating a profile of the first group of users that reflects profiles of users of the first group of users.

Stage 212 includes generating a profile of the second group of users that reflect profiles of users of the second group of users.

Stage 220 includes selecting a first advertisement to broadcast to a first group of handheld television receivers within a cell that are tuned to a first program. The selecting is responsive to profiles of a first group of users that use the first group of handheld television receivers. Conveniently, the selecting is responsive to the profile of the first group of users.

Stage 230 includes selecting a second advertisement to broadcast to a second group of handheld television receivers within the cell that are tuned to a second program. The selecting is responsive to profiles of a second group of users that use the second group of handheld television receivers. Conveniently, the selecting of the second advertisement is responsive to the profile of the second group of users.

Stages 220 and 230 are followed by stage 240 of wirelessly broadcasting a multiplex that includes the first program, the second program, the first advertisement and the second advertisement.

Conveniently method 200 can include at least one additional stage (such as stages 250, 255, 260 and 265) that can be executed in parallel to one of the mentioned above stages, or after one of the mentioned above stages. For simplicity of explanation stage 250 is illustrated as following stage 220 while stage 260 is illustrated as following stage 230.

Stage 250 includes determining to send to a certain user of the first group of users a request to be tuned to the second program.

Stage 250 of determining can be responsive to a correlation between a profile of the certain user and to at least one characteristic of the second advertisement. Thus, the determination can include determining that the second advertisements better matches the profile of the certain user than the first advertisement.

Conveniently, stage 250 includes determining that a correlation between a profile of the certain user and at least one characteristic of the second advertisement is higher by at least a predefined value than the correlation between the profile of the certain user and at least one characteristic of the first advertisement. It is noted that the predefined value can be zero but can also be a positive number. Higher predefined values can statistically reduce the frequency of requests but on the other hand can prevent a user from being aware of advertisements that are slightly more matching to his profile than the advertisement currently being viewed.

Stage 250 is followed by stage 255 of sending to the certain user of the first group of users the request to be tuned to the second program.

Stage 260 includes determining to instruct a handheld television receiver of a certain user of the first group of users to be tuned to the second program.

The determination can be responsive to a correlation between a profile of the certain user and to at least one characteristic of the second advertisement. Thus, the determination can include determining that the second advertisement better matches the profile of the certain user than the first advertisement.

Conveniently, stage 260 includes determining that a correlation between a profile of the certain user and at least one characteristic of the second advertisement is higher by at least a predefined value than the correlation between the profile of the certain user and at least one characteristic of the first advertisement. It is noted that the predefined value can be zero but can also be a positive number. Higher predefined values can statistically reduce the frequency of requests but on the other hand can prevent a user from being aware of advertisements that are slightly more matching to his profile than the advertisement currently being viewed.

Stage 260 is followed by stage 265 of instructing the handheld television receiver of the certain user to be tuned to the second program.

According to an embodiment of the invention the request and/or instruction are sent in a manner that can enable the handheld television receiver to seamlessly tune to the second program or at least to perform the tuning stage with minimal consequences. This can be achieved by synchronizing the tuning to the second advertisement to a content insertion point.

Stages 250-265 relate to a user from the first group of users and to a second advertisement. It is noted that equivalent stages relating to a user from the second group of users and the first advertisement can be included (in addition to or instead of one or more stages out of stages 250-265) in method 200.

It is noted that the first and second program can be different versions of the same original program, that the request or instruction can also be responsive to a relationship between the first and second programs, and the like.

Figure 3:
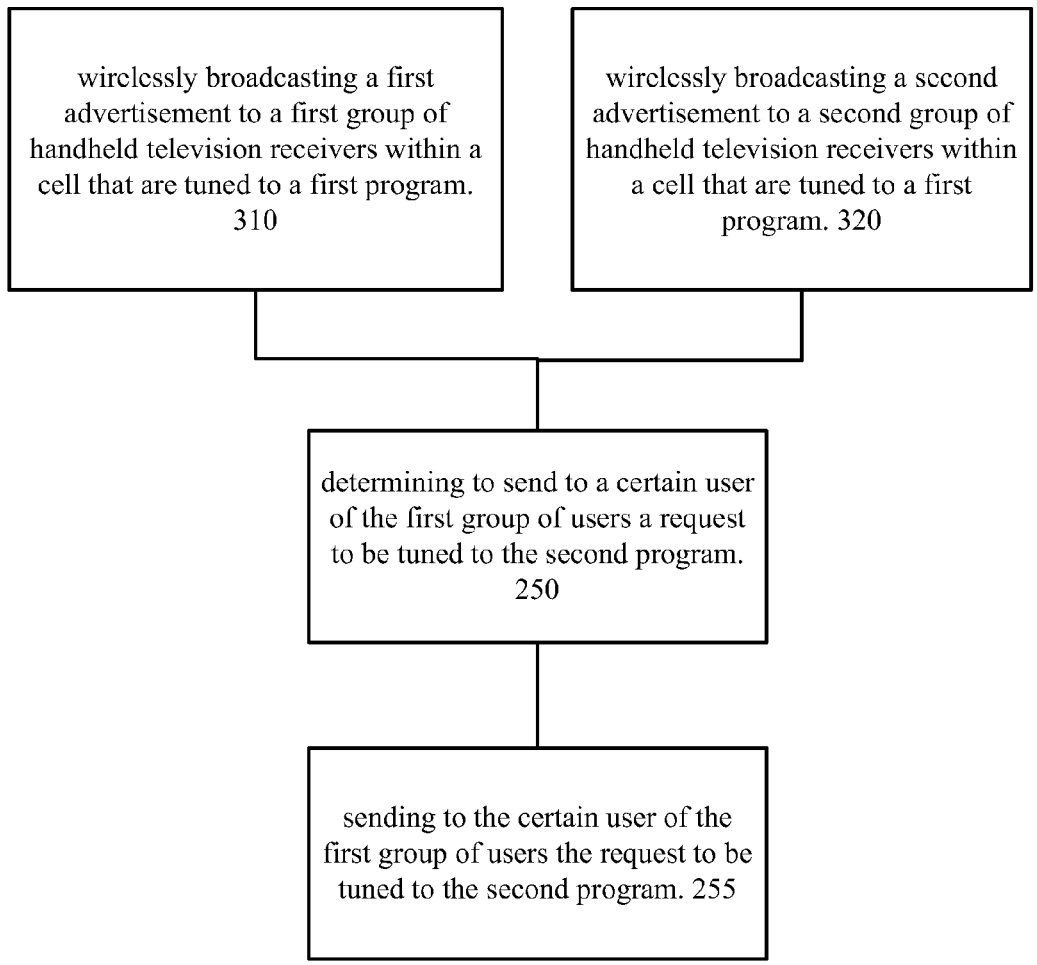

FIG. 3 illustrates method 300 for wirelessly broadcasting advertisements to handheld television receivers according to an embodiment of the invention.

Method 300 starts by stages 310 and 320. Stage 310 includes wirelessly broadcasting a first advertisement to a first group of handheld television receivers within a cell that are tuned to a first program. Stage 320 includes wirelessly broadcasting a second advertisement to a second group of handheld television receivers within a cell that are tuned to a first program.

It is noted that the selection of which advertisement to send to which group of users can be performed by executing one or more stages of method 200 (for example—by executing stages 210-230) or by applying well known techniques.

Stage 320 and 330 are followed by stage 250 of determining to send to a certain user of the first group of users a request to be tuned to the second program. Stage 250 is followed by stage 255 of sending to the certain user of the first group of users the request to be tuned to the second program.

Figure 4:
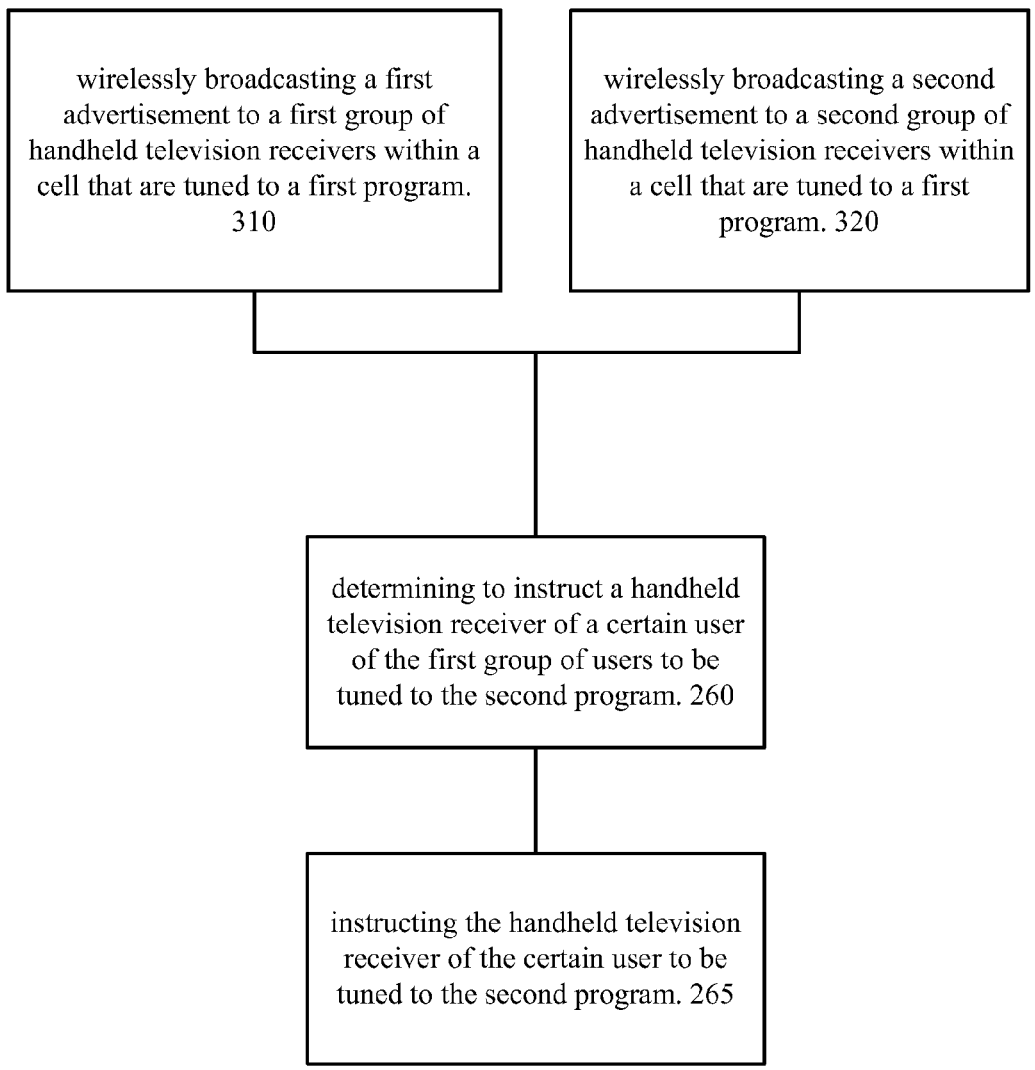

FIG. 4 illustrates method 400 for wirelessly broadcasting advertisements to handheld television receivers according to an embodiment of the invention.

Method 400 starts by stages 310 and 320. Stage 310 includes wirelessly broadcasting a first advertisement to a first group of handheld television receivers within a cell that are tuned to a first program. Stage 320 includes wirelessly broadcasting a second advertisement to a second group of handheld television receivers within a cell that are tuned to a first program.

It is noted that the selection of which advertisement to send to which group of users can be performed by executing one or more stages of method 200 (for example—by executing stages 210-230) or by applying well known techniques.

Stages 320 and 330 are followed by stage 260 of determining to instruct a handheld television receiver of a certain user of the first group of users to be tuned to the second program. Stage 260 is followed by stage 265 of instructing the handheld television receiver of the certain user to be tuned to the second program.

The invention can be executed by a computer-readable code that includes instructions to execute one or more stages of method 100. The computer-readable code can be stored in a computer program product that includes a readable medium such as but not limited to a disk, a tape, a diskette, a compact disk, a memory unit and the like.

Conveniently, a computer readable medium is provided. The computer readable medium has a computer-readable code embodied therein for wirelessly broadcasting advertisements to handheld television receivers, the computer-readable code includes instructions for: selecting a first advertisement to be wirelessly broadcasted to a first group of handheld television receivers within a cell that are tuned to a first program; wherein the selecting is responsive to profiles of a first group of users that use the first group of handheld television receivers; and wirelessly broadcasting a multiplex that comprises the first program and the first advertisement.

Conveniently, the computer-readable code includes instructions for selecting a second advertisement to be wirelessly broadcasted to a second group of handheld television receivers within the cell that are tuned to a second program; wherein the selection is responsive to profiles of a second group of users that use the second group of handheld television receivers; and wirelessly broadcasting a multiplex that comprises the first program, the second program, the first advertisement and the second advertisement.

Conveniently, the computer-readable code includes instructions for sending to a certain user of the first group of users a request to be tuned to the second program.

Conveniently, the computer-readable code includes instructions for sending the request in response to a correlation between a profile of the certain user and to at least one characteristic of the second advertisement.

Conveniently, the computer-readable code includes instructions for determining that a correlation between a profile of the certain user and at least one characteristic of the second advertisement is higher by at least a predefined value than the correlation between the profile of the certain user and at least one characteristic of the first advertisement.

Conveniently, the computer-readable code includes instructions for instructing a handheld television receiver of a certain user of the first group of users to be tuned to the second program.

Conveniently, the computer-readable code includes instructions for instructing in response to a correlation between a profile of the certain user and to at least one characteristic of the second advertisement.

Conveniently, the computer-readable code includes instructions for determining that a correlation between a profile of the certain user and at least one characteristic of the second advertisement is higher by at least a predefined value than the correlation between the profile of the certain user and at least one characteristic of the first advertisement.

Conveniently, the computer-readable code includes instructions for synchronizing a tuning to the second advertisement to a content insertion point.

Conveniently, the computer-readable code includes instructions for generating a profile of the first group of users that reflects profiles of users of the first group of users and generating a profile of the second group of users that reflect profiles of users of the second group of users; wherein the selecting of the first advertisement is responsive to the profile of the first group of users; and wherein the selecting of the second advertisement is responsive to the profile of the second group of users.

Conveniently, a computer readable medium is provided. The computer readable medium has a computer-readable code embodied therein for wirelessly broadcasting advertisements to handheld television receivers, the computer-readable code includes instructions for: wirelessly broadcasting a first advertisement to a first group of handheld television receivers within a cell that are tuned to a first program; wirelessly broadcasting a second advertisement to a second group of handheld television receivers within a cell that are tuned to a first program; and sending to a certain user of the first group of users a request to be tuned to the second program.

Conveniently, the computer-readable code includes instructions for sending in response to a correlation between a profile of the certain user and to at least one characteristic of the second advertisement.

Conveniently, the computer-readable code includes instructions for determining that a correlation between a profile of the certain user and at least one characteristic of the second advertisement is higher by at least a predefined value than the correlation between the profile of the certain user and at least one characteristic of the first advertisement.

Conveniently, a computer readable medium is provided. The computer readable medium has a computer-readable code embodied therein for wirelessly broadcasting advertisements to handheld television receivers, the computer-readable code includes instructions for: wirelessly broadcasting a first advertisement to a first group of handheld television receivers within a cell that are tuned to a first program; wirelessly broadcasting a second advertisement to a second group of handheld television receivers within a cell that are tuned to a first program; and instructing a handheld television receiver of a certain user of the first group of users to be tuned to the second program.

Conveniently, the computer-readable code includes instructions for instructing in response to a correlation between a profile of the certain user and to at least one characteristic of the second advertisement.

Conveniently, the computer-readable code includes instructions for determining that a correlation between a profile of the certain user and at least one characteristic of the second advertisement is higher by at least a predefined value than the correlation between the profile of the certain user and at least one characteristic of the second advertisement.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for wirelessly broadcasting advertisements to handheld television receivers, the method comprises:
    selecting a first advertisement to broadcast to a first group of handheld television receivers within a cell that are tuned to a first program; wherein the selecting is responsive to a first aggregate profile of a first group of users, that reflects individual profiles of users of the first group of users that use the first group of handheld television receivers;
    selecting a second advertisement to broadcast to a second group of handheld television receivers within the cell that are tuned to a second program; wherein the selecting is responsive to a second aggregate profile of a second group of users, that reflects individual profiles of users of the second group of users that use the second group of handheld television receivers;
    wirelessly broadcasting a multiplex that comprises a single instance of the first program, a single instance of the second program, a single instance of the first advertisement and a single instance of the second advertisement; and
    identifying a certain user of the first group of users whose individual profile differs from the aggregate profile, more closely matching the aggregate profile of the second group of users;
    sending to the certain user of the first group of users an instruction to tune to the second program.

2. The method according to claim 1 wherein the sending is responsive to a correlation between a profile of the certain user and to at least one characteristic of the second advertisement; and wherein the sending is responsive to a relationship between the first and second programs.

3. The method according to claim 1 wherein the sending is preceded by determining that a correlation between a profile of the certain user and at least one characteristic of the second advertisement is higher by at least a predefined value than the correlation between the profile of the certain user and at least one characteristic of the first advertisement.

4. The method according to claim 1 further comprising instructing a handheld television receiver of a certain user of the first group of users to be tuned to the second program.

5. The method according to claim 1 further comprising generating a profile of the first group of users that reflects profiles of users of the first group of users and generating a profile of the second group of users that reflect profiles of users of the second group of users; wherein the selecting of the first advertisement is responsive to the profile of the first group of users; and wherein the selecting of the second advertisement is responsive to the profile of the second group of users.

6. The method according to claim 4 wherein the instructing is responsive to a correlation between a profile of the certain user and to at least one characteristic of the second advertisement.

7. The method according to claim 4 wherein the instructing is preceded by determining that a correlation between a profile of the certain user and at least one characteristic of the second advertisement is higher by at least a predefined value than the correlation between the profile of the certain user and at least one characteristic of the first advertisement.

8. The method according to claim 4 further comprising synchronizing a tuning to the second advertisement to a content insertion point.

9. A method for wirelessly broadcasting advertisements to handheld television receivers, the method comprises:
    wirelessly broadcasting a first advertisement to a first group of handheld television receivers within a cell that are tuned to a first program; wherein the first group of handheld television receivers are used by a first group of users, the first advertisement being based on a first aggregate profile for a first group of users associated with the first group of handheld television receivers and reflecting the individual profiles of users within the first group of users, and wherein the cell is selected from multiple cells served by a particular multiple service operator;
    wirelessly broadcasting a second advertisement to a second group of handheld television receivers within the cell that are tuned to a second program, the second advertisement being based on a second aggregate profile for a second group of users associated with the second group of handheld television receivers and reflecting the individual profiles of users within the second group of users;
    identifying a certain user of the first group of users having a divergent profile from the first aggregate profile; and
    sending to the certain user of the first group of users an instruction to tune to the second program.

10. The method according to claim 9 wherein the sending is responsive to a correlation between a profile of the certain user and to at least one characteristic of the second advertisement; and wherein the sending is responsive to a relationship between the first and second programs.

11. The method according to claim 9 wherein the sending is preceded by determining that a correlation between a profile of the certain user and at least one characteristic of the second advertisement is higher by at least a predefined value than the correlation between the profile of the certain user and at least one characteristic of the first advertisement.

12. A method for wirelessly broadcasting advertisements to handheld television receivers, the method comprises:
   wirelessly broadcasting a first advertisement to a first group of handheld television receivers within a cell that are tuned to a first program, the first advertisement being based on a first aggregate profile for a first group of users associated with the first group of handheld television receivers and reflecting the individual profiles of users within the first group of users;
   wirelessly broadcasting a second advertisement to a second group of handheld television receivers within the cell that are tuned to a second program, the second advertisement being based on a second aggregate profile for a second group of users associated with the second group of handheld television receivers and reflecting the individual profiles of users within the second group of users;
   identifying a certain user of the first group of users having a divergent profile from the first aggregate profile;
   sending to the certain user of the first group of users a request to be tuned to the second program; and
   instructing a handheld television receiver of a certain user of the first group of users to be tuned to the second program.

13. The method according to claim 12 wherein the instructing is responsive to a correlation between a profile of the certain user and to at least one characteristic of the second advertisement.

14. The method according to claim 12 wherein the instructing is preceded by determining that a correlation between a profile of the certain user and at least one characteristic of the second advertisement is higher by at least a predefined value than the correlation between the profile of the certain user and at least one characteristic of the first advertisement.

15. A non-transitory computer readable medium having a computer-readable code embodied therein for wirelessly broadcasting advertisements to handheld television receivers, the computer-readable code comprises instructions for:
   selecting a first advertisement to be wirelessly broadcasted to a first group of handheld television receivers within a cell that are tuned to a first program; wherein the selecting is responsive to a first aggregate profile of a first group of users, that reflects individual profiles of users of the first group of users, that use the first group of handheld television receivers, and wherein the cell is selected from multiple cells served by a particular multiple service operator;
   selecting a second advertisement to broadcast to a second group of handheld television receivers within the cell that are tuned to a second program; wherein the selecting is responsive to an second aggregate profile of a second group of users, that reflects individual profiles of users of the second group of users, that use the second group of handheld television receivers;
   wirelessly broadcasting a multiplex that comprises a single instance of the first program, a single instance of the second program, a single instance of the first advertisement and a single instance of the second advertisement; and sending to a certain user of the first group of users an instruction to tune to the second program.

16. The computer readable medium of claim 15 wherein the computer-readable code comprises instructions for sending the request in response to a correlation between a profile of the certain user and to at least one characteristic of the second advertisement; and wherein the sending is responsive to a relationship between the first and second programs.

17. The computer readable medium of claim 15 wherein the computer-readable code comprises instructions for determining that a correlation between a profile of the certain user and at least one characteristic of the second advertisement is higher by at least a predefined value than the correlation between the profile of the certain user and at least one characteristic of the first advertisement.

18. The computer readable medium of claim 15 wherein the computer-readable code comprises instructions for instructing a handheld television receiver of a certain user of the first group of users to be tuned to the second program.

19. The computer readable medium of claim 15 wherein the computer-readable code comprises instructions for generating a profile of the first group of users that reflects profiles of users of the first group of users and generating a profile of the second group of users that reflect profiles of users of the second group of users; wherein the selecting of the first advertisement is responsive to the profile of the first group of users; and
   wherein the selecting of the second advertisement is responsive to the profile of the second group of users.

20. The computer readable medium of claim 18 wherein the computer-readable code comprises instructions for instructing in response to a correlation between a profile of the certain user and to at least one characteristic of the second advertisement.

21. The computer readable medium of claim 18 wherein the computer-readable code comprises instructions for determining that a correlation between a profile of the certain user and at least one characteristic of the second advertisement is higher by at least a predefined value than the correlation between the profile of the certain user and at least one characteristic of the first advertisement.

22. The computer readable medium of claim 18 wherein the computer-readable code comprises instructions for synchronizing a tuning to the second advertisement to a content insertion point.

23. A non-transitory computer readable medium having a computer-readable code embodied therein for wirelessly broadcasting advertisements to handheld television receivers, the computer-readable code comprises instructions for:
   wirelessly broadcasting a first advertisement to a first group of handheld television receivers within a cell that are tuned to a first program, the first advertisement being based on a first aggregate profile for a first group of users associated with the first group of handheld television receivers and reflecting the individual profiles of users within the first group of users;
   wirelessly broadcasting a second advertisement to a second group of handheld television receivers within the cell that are tuned to a second program, the second advertisement being based on a second aggregate profile for a second group of users associated with the second group of handheld television receivers and reflecting the individual profiles of users within the second group of users;
   identifying a certain user of the first group of users a divergent profile from the first aggregate profile; and sending to the certain user of the first group of users an instruction to tune to the second program.

24. The computer readable medium of claim 23 wherein the computer-readable code comprises instructions for sending in response to a correlation between a profile of the certain user and to at least one characteristic of the second advertisement.

25. The computer readable medium of claim 23 wherein the computer-readable code comprises instructions for determining that a correlation between a profile of the certain user and at least one characteristic of the second advertisement is higher by at least a predefined value than the correlation between the profile of the certain user and at least one characteristic of the first advertisement.

26. A non-transitory computer readable medium having a computer-readable code embodied therein for wirelessly broadcasting advertisements to handheld television receivers, the computer-readable code comprises instructions for:
   wirelessly broadcasting a first advertisement to a first group of handheld television receivers within a cell that are tuned to a first program, the first advertisement being based on a first aggregate profile for a first group of users associated with the first group of handheld television receivers and reflecting the individual profiles of users within the first group of users;
   wirelessly broadcasting a second advertisement to a second group of handheld television receivers within the cell that are tuned to a second program, the second advertisement being based on a second aggregate profile for a second group of users associated with the second group of handheld television receivers and reflecting the individual profiles of users within the second group of users;
   identifying a certain user of the first group of users a divergent profile from the first aggregate profile;
   sending to the certain user of the first group of users an instruction to tune to the second program; and
   instructing a handheld television receiver of the certain user of the first group of users to be tuned to the second program.

27. The computer readable medium of claim 26 wherein the computer-readable code comprises instructions for instructing in response to a correlation between a profile of the certain user and to at least one characteristic of the second advertisement.

28. The computer readable medium of claim 26 wherein the computer-readable code comprises instructions for determining that a correlation between a profile of the certain user and at least one characteristic of the second advertisement is higher by at least a predefined value than the correlation between the profile of the certain user and at least one characteristic of the first advertisement.

29. A system for wirelessly broadcasting advertisements, the system comprises a memory unit coupled to a processor, wherein the processor is adapted to:
   select a first advertisement to broadcast to a first group of handheld television receivers within a cell that are tuned to a first program; wherein the selection is responsive to an aggregate profile of a first group of users, that reflects individual profiles of users of the first group of users, that use the first group of handheld television receivers;
   select a second advertisement to broadcast to a second group of handheld television receivers within the cell that are tuned to a second program; wherein the selection is responsive to a profile of a second group of users, that reflects profiles of users of the second group of users, that use the second group of handheld television receivers;
   assist in controlling a wireless broadcast of a multiplex that comprises a single instance of each of the first program, the first advertisement, the second program and the second advertisement;
   identifying a certain user of the first group of users a divergent interest from a remainder of the first group of users; and
   send to the certain user of the first group of users a request to be tuned to the second program.

30. The system according to claim 29 wherein the system is adapted to send the request in response to a correlation between a profile of the certain user and to at least one characteristic of the second advertisement.

31. The system according to claim 29 wherein the system is adapted to send the request in response to a determination that a correlation between a profile of the certain user and at least one characteristic of the second advertisement is higher by at least a predefined value than the correlation between the profile of the certain user and at least one characteristic of the first advertisement.

32. The system according to claim 29 wherein the system is adapted to instruct a handheld television receiver of a certain user of the first group of users to be tuned to the second program.

33. The system according to claim 29 further adapted to generate a profile of the first group of users that reflects profiles of users of the first group of users and to generate a profile of the second group of users that reflect profiles of users of the second group of users; wherein the selection of the first advertisement is responsive to the profile of the first group of users; and wherein the selection of the second advertisement is responsive to the profile of the second group of users.

34. The system according to claim 32 wherein the system is adapted to instruct in response to a correlation between a profile of the certain user and to at least one characteristic of the second advertisement.

35. The system according to claim 32 wherein the system is adapted to instruct in response to a determination that a correlation between a profile of the certain user and at least one characteristic of the second advertisement is higher by at least a predefined value than the correlation between the profile of the certain user and at least one characteristic of the first advertisement.

36. The system according to claim 35 wherein the system is adapted to synchronize a tuning to the second advertisement to a content insertion point.

* * * * *